United States Patent [19]

Bistrian, Jr. et al.

[11] 4,300,400

[45] Nov. 17, 1981

[54] ACOUSTIC FLOWMETER WITH REYNOLDS NUMBER COMPENSATION

[75] Inventors: John M. Bistrian, Jr., Gibson Island; Lawrence G. Wright, Pasadena, both of Md.

[73] Assignee: Westinghouse Electric Corp., Pittsburgh, Pa.

[21] Appl. No.: 27,433

[22] Filed: Apr. 5, 1979

[51] Int. Cl.³ .............................................. G01F 1/66
[52] U.S. Cl. ............................................... 73/861.28
[58] Field of Search .................... 73/194 A, 3, 861.27, 73/861.28, 861.29, 861.31

[56] References Cited

U.S. PATENT DOCUMENTS

| | | | |
|---|---|---|---|
| 3,901,078 | 8/1975 | McShane | 73/194 A |
| 3,906,791 | 9/1975 | Lynnworth | 73/194 A |
| 4,078,427 | 3/1978 | Yoshida et al. | |
| 4,078,428 | 3/1978 | Baker et al. | 73/194 A |
| 4,103,551 | 8/1978 | Lynnworth | |
| 4,109,523 | 8/1978 | Teyssandier | 73/194 A |

OTHER PUBLICATIONS

PFAU–"Optimization of the Test Section Length in Integrating Flow Measurement Methods"–Arch. Tech. Mes. Ind. Messtech. 21-4 (Feb. 1973).
Series 240 Flow Measurement System–Controlotron Corp.
W. H. Lynch, et al.—"Flow Measurement with a New Ultrasonic Flowmeter"—Flow its Measurement and Control in Science and Industry–vol. 1, Part II, pp. 925–931, 1974.
J. L. McShane–"Ultrasonic Flowmeters"—Flow its Measurement and Control in Science and Industry–vol. 1, Part II, pp. 898–913, 1974.
P. Franchi–*Ultrasonics*, vol. 4, No. 10, pp. 176–177, Oct. 1966.
J. Obraz–*Technical Digest*, vol. 10, No. 10, pp. 632–636, Oct. 1968.
Engineering, Materials & Design, vol. 23, No. 6, pp. 42–45, 1979.

Primary Examiner—Charles A. Ruehl
Attorney, Agent, or Firm—D. Schron

[57] ABSTRACT

An acoustic flowmeter wherein pulses of acoustic energy are transmitted between upstream and downstream transducers through the fluid under measurement and wherein the arithmetic computation of velocity based upon the difference in time measurement of the oppositely-directed pulses is modified by predetermined factors to automatically compensate for errors caused by a Reynolds number change due to flow velocity change.

8 Claims, 5 Drawing Figures

ACOUSTIC FLOWMETER WITH REYNOLDS NUMBER COMPENSATION

BACKGROUND OF THE INVENTION

1. Field of the Invention

The invention in general relates to flowmeters, and particularly to an acoustic flowmeter for obtaining volumetric flow rates to a high degree of accuracy in the presence of varying Reynolds number.

2. Description of the Prior Art

A variety of systems exist for measuring velocity or volumetric flow rate of a fluid in a pipe. Many of these systems utilize the propagation of acoustic energy through the fluid in the pipe to obtain the desired readings. In some systems, acoustic energy is propagated from an upstream transducer to a downstream transducer, and vice versa, and the difference in transit times of the oppositely directed acoustic energy is utilized in the computation of fluid flow. Other systems for example use the difference in phase of oppositely directed acoustic signals while still other systems utilize a sing-around technique either along a single path or along two closely-spaced parallel paths, to obtain a frequency difference indicative of fluid flow.

For highly distorted fluid flow and situations where the fluid is subject to variations in the velocity profile, use is made of an acoustic system having a plurality of acoustic paths provided at specific locations, with the individual flow readings from each path being combined according to a numerical integration technique such as the Gaussian technique to compute volumetric flow rate.

It is often desirable, however, from an economic standpoint to utilize a less expensive, single path system (or a two path sing-around system) rather than a multi-path system as in the Gaussian technique. In single path systems generally, a peak velocity indication is obtained and this value must be modified by some meter factor in order to obtain mean velocity. The meter factor, however, is calibrated for a particular velocity profile which in actuality changes with Reynolds number, which for a given pipe diameter and fluid varies with velocity.

Generally, in a system in which velocity is obtained along a diametrical path, operation is predicated upon a particular fixed Reynolds number. However, a Reynolds number variation of from $1 \times 10^4$ to $1 \times 10^7$ would cause a change of 4% in the meter factor. To compensate, some systems take measurements along a chordal path located at a certain distance from the center of the pipe, where readings are relatively insensitive to profile changes.

There are advantages to be able to mount the transducers relative to the pipe so as to obtain a reading along a diametrical path and the present invention provides for a highly accurate flowmeter system including such placement, even in the presence of varying Reynolds number.

SUMMARY OF THE INVENTION

Acoustic flowmeter apparatus in accordance with the present invention measures fluid flow in a conveyance in which the fluid is subject to a varying Reynolds number. Means are provided for transmitting acoustic energy through the fluid by any one of a number of well-known systems to obtain an indication of fluid velocity. Means are provided for modifying the indication obtained including means for automatically compensating for varying Reynolds number as a function of the velocity. In one embodiment, the velocity indication is obtained as a function of transit time of acoustic energy projected between upstream and downstream transducer stations.

DESCRIPTION OF THE PREFERRED EMBODIMENTS

Figure 1:
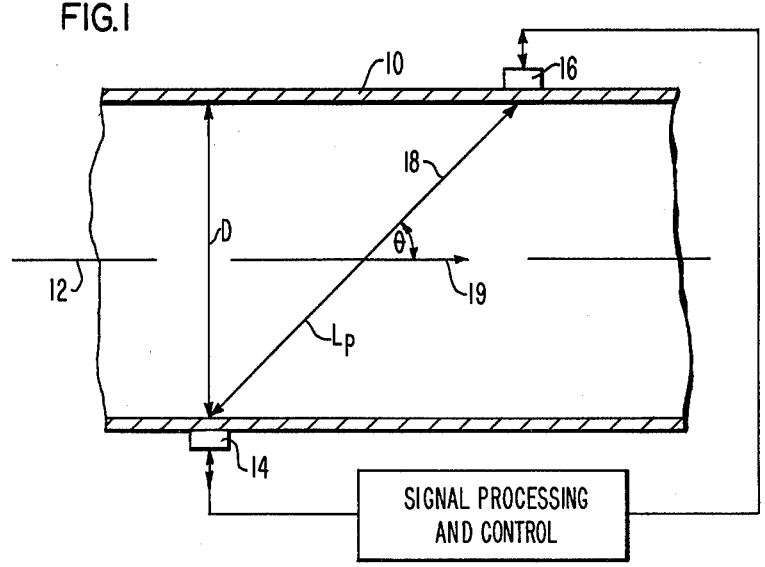
FIG. 1 is a view, partially in section, of typical acoustic flowmeter apparatus for measuring fluid flow in a pipe.

FIG. 1 illustrates typical apparatus for obtaining an indication of fluid velocity or volumetric flow rate in a pipe, volumetric flow rate being equal to the mean velocity in the pipe times the cross-sectional area of the pipe.

Pipe 10 is of diameter D and has a pipe axis 12. In one widely-used system, upstream and downstream transducers 14 and 16 are disposed relative to the pipe for projecting acoustic energy toward one another along a path 18 of length $L_P$ lying at an angle $\theta$ relative to the fluid flow, as represented by arrow 19. Other variations may include two adjacent closely-spaced parallel acoustic paths or two acoustic paths forming an "X" with one another. Signal processing and control circuitry 20 provides the necessary energizing signals to the transducers and processes the signal provided by them to compute and provide an indication of fluid velocity and/or volumetric flow rates.

The difference in transit times of acoustic energy projected upstream by transducer 16 and downstream by transducer 14 is an indication of the velocity of the fluid in the pipe. Various systems use this time difference concept such as by way of example, projecting pulses of acoustic energy and measuring the actual difference in transit times, or having received pulses generate transmit pulses such that the frequency thereof is an indication of velocity. Still other systems may utilize sinusoidal signals which, due to the difference in transit time, will be out of phase with respect to one another, the phase difference being an indication of fluid velocity. Still other systems may use the deflection of a beam projected across the pipe to provide a velocity indication.

Figure 2:
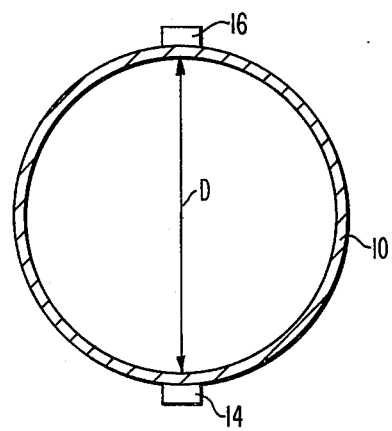
FIG. 2 is an end view looking into the pipe of FIG. 1.

With the acoustic path in FIG. 1 being projected so as to intersect the pipe axis 12, the apparatus obtains an indication of fluid velocity averaged over a diametrical path. The end view of the apparatus as illustrated in FIG. 2 additionally shows this path.

Figure 3:
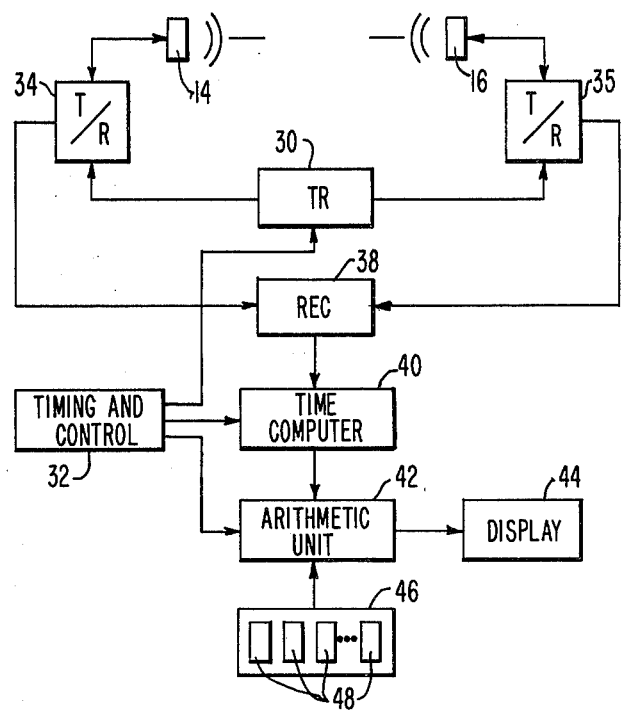
FIG. 3 is a block diagram illustrating the signal processing and control apparatus of FIG. 1 in somewhat more detail.

FIG. 3 illustrates one embodiment of a signal processing and control circuit for practicing the present invention. By way of example, the flowmeter system implemented is that wherein acoustic pulses are transmitted between upstream and downstream transducers and the difference in travel times thereof are obtained to derive an indication of fluid flow.

Transmitter circuit 30 is operable, under control of timing and control circuit 32, to provide energizing signals through TR (transmit/receive) switch 34 to upstream transducer 14 and to provide energizing signals through TR switch 35 to downstream transducer 16. Upon receipt of an energizing signal, each transducer will produce respective acoustic pulses which are projected through the fluid medium. Various different modes of operation are possible such as simultaneously supplying the upstream and downstream transducers with energizing pulses or to provide one transducer with an entire series of pulses and thereafter provide the other transducer with a like series of pulses.

Upon receipt of an acoustic signal projected through the fluid, each transducer will provide a respective output signal, these signals being provided through respective TR switches 34 and 35 to a receiver circuit 38 to generate respective received pulses.

If $T_1$ is the transit time of the acoustic pulse from the upstream transducer to the downstream transducer, and $T_2$, the transit time from the downstream transducer to the upstream transducer, time computer circuit 40, under control of timing and control circuit 32, is operable to receive the output of circuit 38 to compute the values $T_1$, $T_2$ and $T_2-T_1$. Knowing these values, the arithmetic unit 42, also under control of timing and control circuit 32 is operable to calculate fluid velocity and/or volumetric flow rate and provide an output signal to display 44.

In accordance with the teachings of the present invention, the calculations for fluid flow are modified to automatically correct for varying Reynolds number. In one embodiment, this is accomplished by inputting a certain value into the arithmetic calculation by means of a unit 46 which supplies a predetermined modifying factor of a certain precalculated value. This value is outputted by constant unit 46 by proper manual selection on thumbwheel switches 48.

The basic block diagram illustrated in FIG. 3 has been greatly simplified to aid in an understanding of the basic components. A typical flowmeter operating as described is a commercially available item sold by Westinghouse Electric Corporation under the flowmeter designation of LEFM801.

Figure 4:
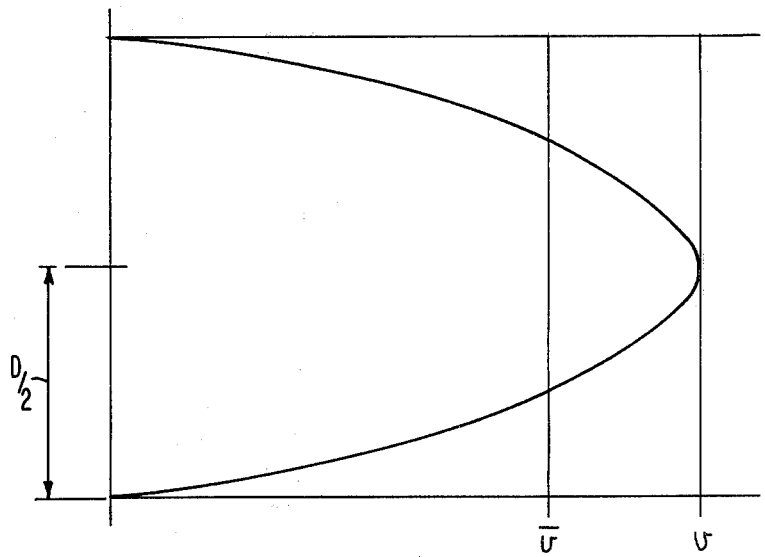
FIG. 4 is a curve representing the velocity profile of the fluid in the pipe of FIG. 1.

If the velocity of the fluid flowing in the pipe is plotted point-by-point starting at one wall, going through the axis of the pipe, and ending on the wall at a point diametrically opposite the first point, a velocity distribution curve such as illustrated in FIG. 4 results. The velocity experienced along the pipe axis is a peak value and does not actually represent the mean value V which is less than the maximum velocity by some factor. This factor is known as the meter factor and is the constant by which the velocity must be multiplied to obtain mean velocity, that is, it is the ratio of mean velocity to peak velocity. A problem arises, however, that under many operating conditions, the velocity profile which depends on various factors, one of which is Reynolds number, is varying. For a fully developed flow, Reynolds number may vary from 10,000 to 10,000,000, by way of example, so that a need exists for varying the meter factor as the Reynolds number varies. The relationship between meter factor and Reynolds number between the limits of 10,000 and 10,000,000 is illustrated by way of example by the curve of FIG. 5 wherein meter factor is plotted on the vertical axis and Reynolds number on the horizontal axis.

Since Reynolds number varies with velocity, in the present invention the fluid flow readings obtained by the apparatus are modified as a function of fluid velocity, and are therefore modified as a function of time measurements in those systems which utilize such measurements. The concept will be described by way of example with the system illustrated in FIG. 3.

Figure 5:
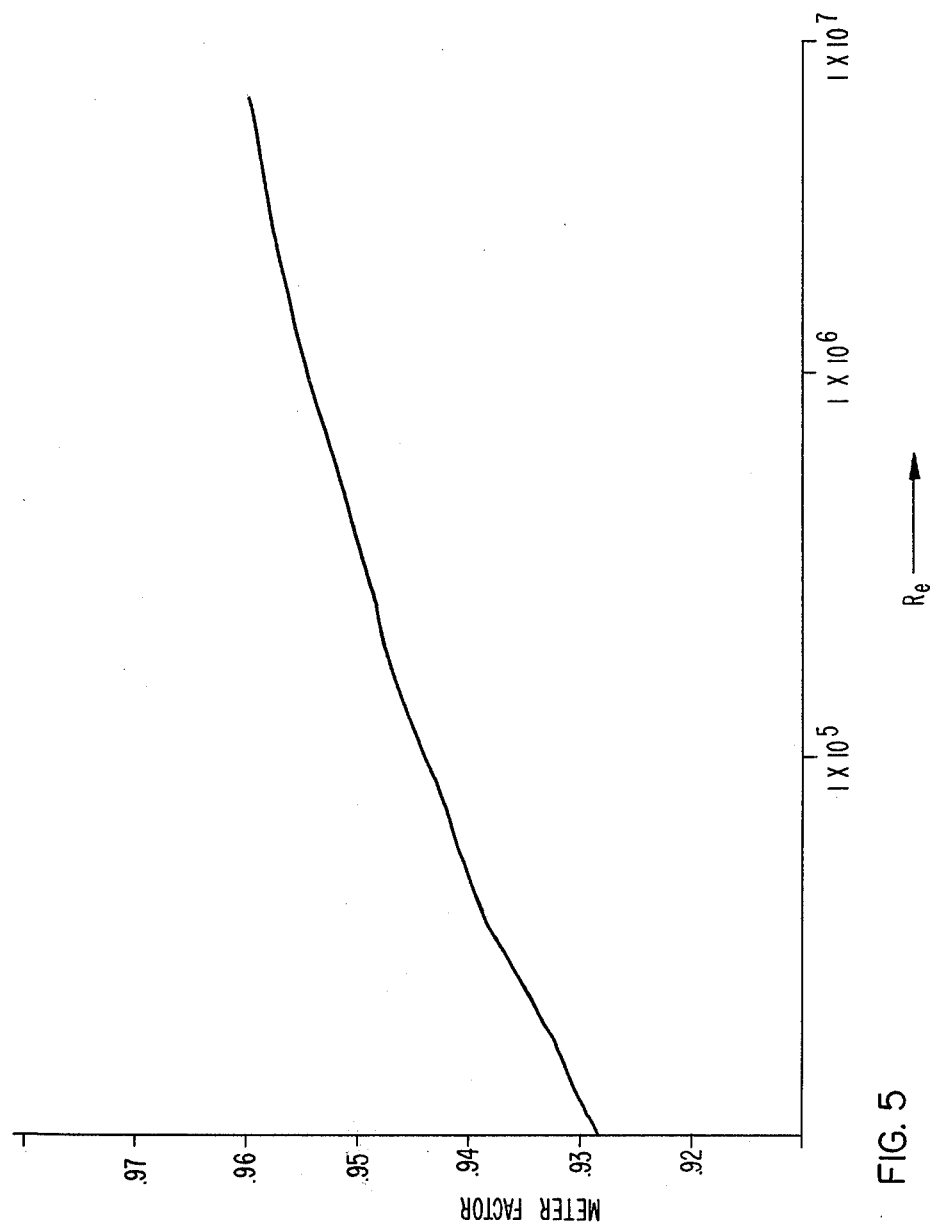
FIG. 5 is a curve illustrating the variation of meter factor with Reynolds number.

Initially, an expression for the curve of FIG. 5 is derived. That is, an equation is derived which will "fit" the curve to a close approximation. There are a number of ways in which this curve fitting may be attempted including polynomial approximation and harmonic analysis. The expression may easily be derived by use of a computer program called Curfit, a program of Tymshare Inc. of Palo Alto, California. Utilizing the Curfit program and the data of FIG. 5, one expression which describes the curve of FIG. 5 is given by equation (1):

$$Y = \alpha(X)^\beta \tag{1}$$

where $\alpha$ and $\beta$ are constants. In terms of the variables meter factor (MF) and Reynolds number (Re) of FIG. 5, equation (1) may be expressed as:

$$MF = \alpha(Re)^\beta \tag{2}$$

Reynolds number may be defined by the expression:

$$Re = \frac{D}{\nu} V \tag{3}$$

where D is the pipe diameter, $\nu$ is the kinematic viscosity of the fluid in the pipe, and V is the mean velocity of the fluid in the pipe. In the acoustic systems discussed, velocity is a function of the flight times of the projected acoustic energy, that is:

$$V = K \cdot F(T) \tag{4}$$

where K is a constant. Combining equations (2), (3) and (4):

$$MF = \alpha \left( \frac{D}{\nu} \cdot K \cdot F(T) \right)^\beta \tag{5}$$

Most flowmeters obtain an indication of volumetric flow rate in accordance with the expression:

$$Q_a = MF \cdot Q_u \tag{6}$$

where
  $Q_a$ is the actual flow rate
  MF is the meter factor
  $Q_u$ is the uncompensated flow rate.
Volumetric flow rate is equal to the cross-sectional area of the pipe times the mean fluid velocity or:

$$Q_u = A \cdot V \tag{7}$$

Since the meter factor is given by the expression of equation (5) and velocity by the expression of equation (4), equation (6) is then:

$$Q_a = \left[ \alpha \left( \frac{D}{\nu} \cdot K \cdot F(T) \right)^\beta \right] \cdot [A \cdot K \cdot F(T)] \tag{8}$$

Rearranging equation (8):

$$Q_a = \left[ \alpha \left( \frac{D}{\nu} \cdot K \right)^\beta \cdot (A \cdot K) \right] \cdot (F(T))^{\beta+1} \tag{9}$$

All of the terms within the bracket are known terms, and combined, constitute a constant by which to multiply the function of T expression raised to the $\beta+1$ power. Equation (9), therefore, is significant in that the variation of meter factor with Reynolds number has in effect been implemented in the equation, which yields the actual flow rate such that velocity indications as manifest by the time measurements raised to some particular power other than one and modified by some particular constant will yield a Reynolds number compensated output reading.

For the system of FIG. 3, the time $T_1$ that it takes a pulse to travel from the upstream transducer to the downstream transducer is given by the expression:

$$T_1 = \frac{L_p}{C + V \cos \theta} \tag{10}$$

and the time $T_2$ that it takes a pulse to travel from the downstream transducer to the upstream transducer is given by the expression:

$$T_2 = \frac{L_p}{C - V \cos \theta} \tag{11}$$

where C is the speed of sound in the fluid and $L_p$ and $\theta$ are illustrated in FIG. 1. Rearranging equations (10) and (11):

$$C + V \cos \theta = \frac{L_p}{T_1} \tag{12}$$

$$C - V \cos \theta = \frac{L_p}{T_2} \tag{13}$$

Subtracting equation (13) from equation (12):

$$V = \frac{L_p}{2 \cos \theta} \cdot \frac{T_2 - T_1}{T_1 T_2} \tag{14}$$

Since, from FIG. 1:

$$L_p = \frac{D}{\sin \theta} \tag{15}$$

$$V = \left( \frac{D}{2 \sin \theta \cos \theta} \right) \cdot \frac{T_2 - T_1}{T_1 T_2} \tag{16}$$

The expression for velocity in equation (16) is the same as the expression for velocity of equation (4), where the K term is equal to the term in parentheses and the function of T is given by the expression:

$$\frac{T_2 - T_1}{T_1 T_2}$$

Therefore, in terms of meter factor such as in equation (5):

$$MF = \alpha \left[ \frac{D}{\nu} \cdot \frac{D}{2 \sin \theta \cos \theta} \right]^\beta \cdot \left[ \frac{T_2 - T_1}{T_1 T_2} \right]^\beta \tag{17}$$

The expression for $Q_a$ of equation (8) may then be expressed as:

$$Q_a = \alpha \left[ \frac{D}{\nu} \cdot \frac{D}{2 \sin \theta \cos \theta} \right]^\beta \left[ \frac{T_2 - T_1}{T_1 T_2} \right]^\beta \cdot A \left( \frac{D}{2 \sin \theta \cos \theta} \right) \frac{T_2 - T_1}{T_1 T_2} \tag{18}$$

Since:

$$A = \pi D^2 / 4 \tag{19}$$

and $$2 \sin \theta \cos \theta = \sin 2\theta \tag{20}$$

equation (18) may be expressed as:

$$Q_a = \left[ \alpha \left( \frac{D^2}{\nu \sin 2\theta} \right)^\beta \cdot \left( \frac{\pi D^3}{4 \sin 2\theta} \right) \right] \cdot \left[ \frac{T_2 - T_1}{T_1 T_2} \right]^{\beta+1} \tag{21}$$

All of the terms in the first bracketed expression are known and the second bracketed term is the time expression raised to a particular power other than one ($\beta+1$). Equation 21 therefore is of the form:

$$Q_a = K'[F(T)]^{\beta+1} \tag{22}$$

The arithmetic unit 42 of FIG. 3 performs the arithmetic operation of subtracting $T_1$ from $T_2$ and dividing by $T_1 \times T_2$ and raising the resultant value to the $\beta+1$ power. The modification by constant K' is also accomplished by the arithmetic unit 42 with the value of K' being inputted from constant unit 46, the value of K' being dialed in by means of the thumbwheel switches 48. For determining the constant K', $\alpha$ and $\beta$ are dimensionless positive numbers provided by the computer program as a result of data points from the curve of FIG. 5 being provided for the curve fit computation. D is the pipe diameter in certain dimensions and $\nu$ is the kinematic viscosity of the fluid. The constant K' may be further modified so that the quantity $Q_a$ is in desired units such as cubic feet per unit of time, cubic meters per unit of time, liters per unit of time, barrels per unit of time, or percentage of full flow, to name a few.

The equation chosen for the implementation of the present invention, that is equation (1), allows for a relatively simplified arithmetic unit which only has to perform a subtraction, multiplication and division of two time quantities raised to a particular power and multiplied by a constant. Other equations are possible to describe the curve of FIG. 5, such as a multi-order polynominal, however, this would involve a much more complicated and expensive arithmetic unit which would be required to raise the time expression to various different powers and to provide multiplication of a plurality of different constants.

As contrasted with normal operation wherein a Reynolds number is chosen and an appropriate meter factor is selected from a curve such as that of FIG. 5, the present invention allows for a varying Reynolds number and a consequent effective varying correction factor.

We claim:

1. Acoustic flowmeter apparatus for measuring fluid flow in a conveyance, said fluid being subject to a varying Reynolds number, comprising:
   (a) means for projecting acoustic energy through said fluid from respective upstream and downstream transducers, the relative upstream and downstream travel times of said projected acoustic energy being indicative of the velocity of said fluid;
   (b) means for obtaining an indication of said fluid velocity based upon said travel times;
   (c) arithmetic means for raising said indication to a predetermined power other than one and thereafter modifying by a predetermined constant value.

2. Apparatus according to claim 1 wherein:
   (a) said means for projecting acoustic energy through said fluid includes spaced apart transducers arranged to project acoustic energy through said fluid along a single acoustic path.

3. Apparatus according to claim 2 wherein:
   (a) said conveyance is a circular pipe; and
   (b) said acoustic path intersects the central axis of said pipe.

4. Apparatus according to claim 1 wherein:
   (a) said arithmetic means includes means for modifying by predetermined scaling factors.

5. Apparatus according to claim 1 wherein:
   (a) said power is greater than one.

6. Apparatus according to claim 1 which includes:
   (a) means for supplying said constant value to said arithmetic means;
   (b) said constant value being manually selectable.

7. Apparatus according to claim 1 which includes:
   (a) display means; and
   (b) means for supplying the results of the operation of said arithmetic means to said display means.

8. Apparatus according to claim 7 wherein:
   (a) said arithmetic means is operable to supply said display means with an indication of fluid volumetric flow rate.

* * * * *